United States Patent [19]

Hubbard et al.

[11] 4,116,532

[45] Sep. 26, 1978

[54] FIBER POSITIONING AND CONNECTION METHOD AND APPARATUS

[75] Inventors: William Marshall Hubbard, Colts Neck; Willis Martin Muska, Little Silver, both of N.J.

[73] Assignee: Bell Telephone Laboratories, Incorporated, Murray Hill, N.J.

[21] Appl. No.: 756,997

[22] Filed: Jan. 5, 1977

[51] Int. Cl.² ............................................. G02B 5/14
[52] U.S. Cl. ................................................ 350/96.21
[58] Field of Search ............ 350/96 C, 96 R, 96 WG, 350/96.21

[56] References Cited

U.S. PATENT DOCUMENTS

| | | | |
|---|---|---|---|
| 3,768,146 | 10/1973 | Braun et al. | 350/96 C |
| 3,864,018 | 2/1975 | Miller | 350/96 C |
| 3,885,859 | 5/1975 | Dalgleish et al. | 350/96 C |
| 3,912,574 | 10/1975 | Cherin et al. | 350/96 C |
| 3,948,582 | 4/1976 | Martin | 350/96 C |
| 4,029,390 | 6/1977 | Chinnock et al. | 350/96 C |

FOREIGN PATENT DOCUMENTS 1,447,317  8/1976  United Kingdom ............... 350/96 C

OTHER PUBLICATIONS

*Electronics,* vol. 49, No. 23, pp. 8–13, Nov. 76.
*Electronics Review,* Aug. 75, pp. 29–30, "Fiber-Optic Cable Getting Connector for use in Field".

*Primary Examiner*—John K. Corbin
*Assistant Examiner*—Stewart Levy
*Attorney, Agent, or Firm*—Daniel D. Dubosky; John K. Mullarney

[57] ABSTRACT

An optical fiber coupling assembly is mounted on the back of a repeater module so that when the repeater is slid into a rack near which an optical fiber frame plug is mounted, the optical fibers of the frame plug are laterally captured at an orientation angle by tapered grooves in an alignment receptacle of the coupling assembly and progressively urged so as to be precisely positioned near repeater optical fibers or semiconductor devices. A spring loaded construction automatically decreases the orientation angle to zero so that the fibers rest in the whole length of the grooves. The assembly additionally slides the fibers relative to the grooves and into abutment with the fibers or devices to which they are being coupled.

18 Claims, 5 Drawing Figures

FIBER POSITIONING AND CONNECTION METHOD AND APPARATUS

BACKGROUND OF THE INVENTION

The present invention relates to the field of precise positioning of fibers and of automatic means and methods of coupling fibers such as glass optical fibers, either to other fibers or to devices relative to which they are to be precisely positioned.

Fibers or threads of material are staple articles in broad areas of manufacture serving as products themselves or as important parts of more complex finished products.

By way of illustration, in recent years, fibers or threads of glass have become of increasing interest for their ability to support the transmission of communication signals over long distances on wavelengths in the infrared, visible, and ultraviolet portions of the optical spectrum. Glass optical fibers are frequently required to be precisely and repeatably positioned relative to other articles, structures and devices in optical communications systems so that low loss optical couplings may be achieved. Means of providing such repeatable precise positioning continues to be a challenge to a technology which requires inexpensive and reliable positioning and coupling devices preferably amenable to installation and use by relatively unskilled personnel.

SUMMARY OF THE INVENTION

According to the present invention, fibers may be very accurately positioned for a wide variety of applications by means of a fiber receptacle block having at least one groove, one end of which is approximately the width of the fiber to be positioned and called a precision positioning zone. Each such groove in the block also includes a remote portion called a capture zone, tapering outward or otherwise being substantially wider than the fiber. Nearby, a fiber holder is provided for one or more fibers which are to be precisely positioned respectively in each groove of the receptacle block. The apparatus of the invention is further arranged so that the fiber receptacle and holder are brought together transversely or otherwise laterally at an angle called the relative orientation angle so that the fiber or fibers are respectively captured in the capture zone of each groove, but initially do not contact any other portion of the fiber receptacle. A flexible or resilient positioning pressure is provided by means of a spring or flexible substance so as to cause the fiber receptacle and holder to be automatically adjusted in relative orientation so that the orientation angle decreases to zero. In the process the fiber or fibers are progressively urged and seated laterally along the groove or grooves so that each fiber finally comes to rest precisely positioned in each precision positioning zone of each groove. A deep channel or depression transverse to the grooves can be located near the precision positioning zone for fiber end protection.

The invention not only provides accurate lateral positioning as just described, but also provides a precise longitudinal or axial positioning of fibers, such as between optical fiber ends in the holder and optical fibers or semiconductor devices located in the fiber receptacle. In this regard the invention utilizes the flexible positioning pressure previously mentioned to produce a longitudinal relative sliding of the fiber rceptacle and holder along a guiding surface oblique to the direction of the pressure, so that fiber ends slide against one another or against appropriate devices at a stop surface. By virtue of the previously mentioned transverse channel, the delicate optically finished ends of optical fibers avoid physical contact except at the stop surface in the sliding process.

By means of the fiber positioning and coupling apparatus of the invention, it is readily apparent that a precision positioning operation or operations can be accomplished automatically and in a manner fully compatible with use by relatively unskilled personnel. Microscopic observation of the fibers to be joined is obviated. Abrasion of delicate fiber ends is reduced first because each fiber end is captured at a point remote from the optical surface of the fiber end and second because the provision of one or more depressions near the precision positioning zone suffices to reduce contact of each fiber end with abrasive or abradable substances.

The invention readily lends itself to inexpensive mass production in that all of its parts can be made of inexpensive molded plastics or other readily available materials. Moreover, the invention includes such subassemblies as the receptacle block, the receptacle block spring-loaded in a mounting block, and the fiber holder spring-loaded in a mounting block as the application may require. Fiber optic communications equipment modules and rack and frame connecting bays for such modules are readily constructed according to the invention.

While the description of the invention is primarily cast in terms of its uses in the technology of glass optical fiber positioning and coupling techniques, it will be appreciated that the novel structures and method of the invention are applicable in a wide variety of apparatus for positioning and otherwise utilizing fibers of various materials in manufacture and ultimate user applications.

DETAILED DESCRIPTION OF THE DRAWINGS

Figure 1:
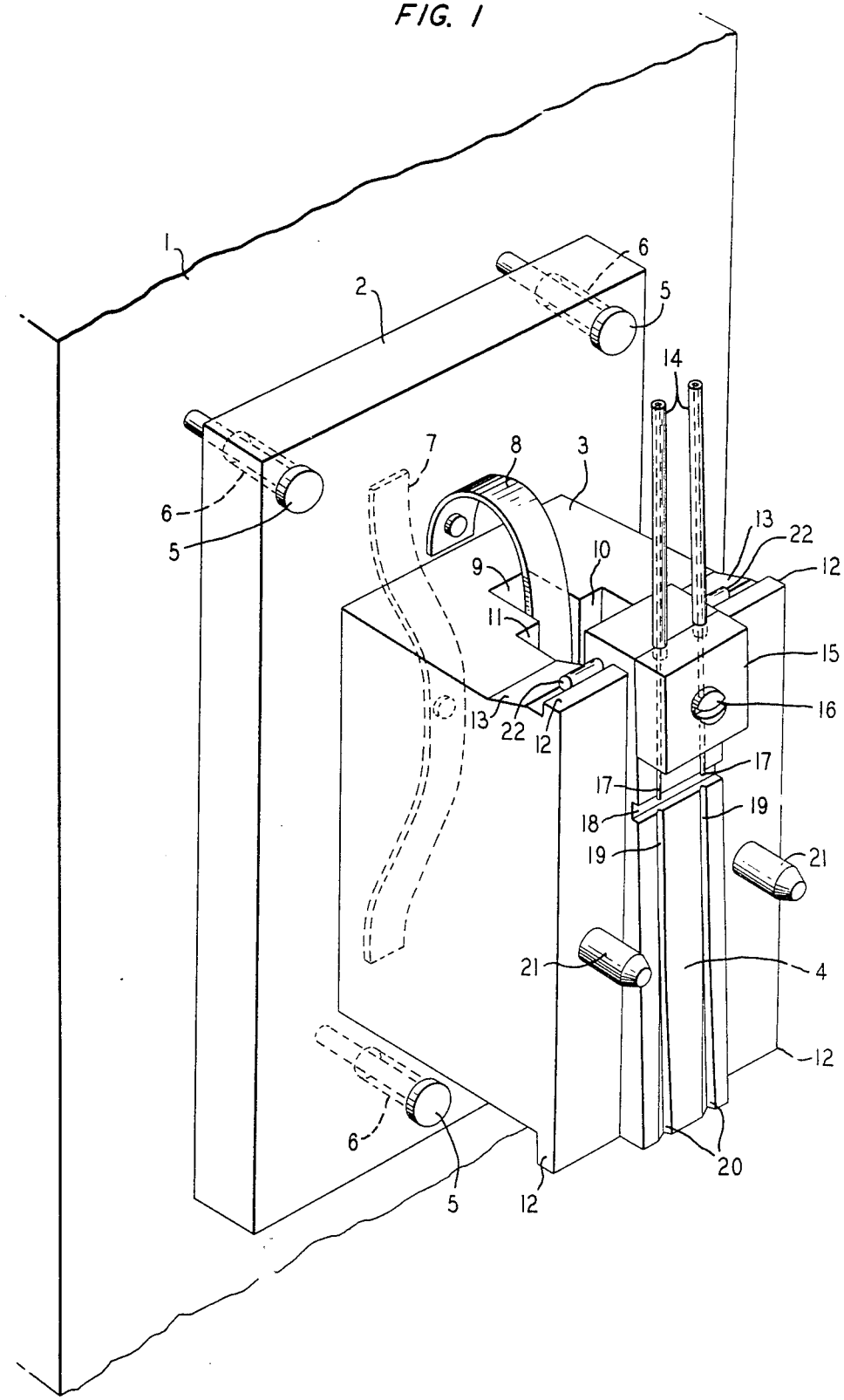
FIG. 1 is a pictorial diagram of a subassembly article of manufacture according to the invention for mounting as part of a communications module usable for fiber positioning and fiber coupling according to the method of the invention.
Figure 2:
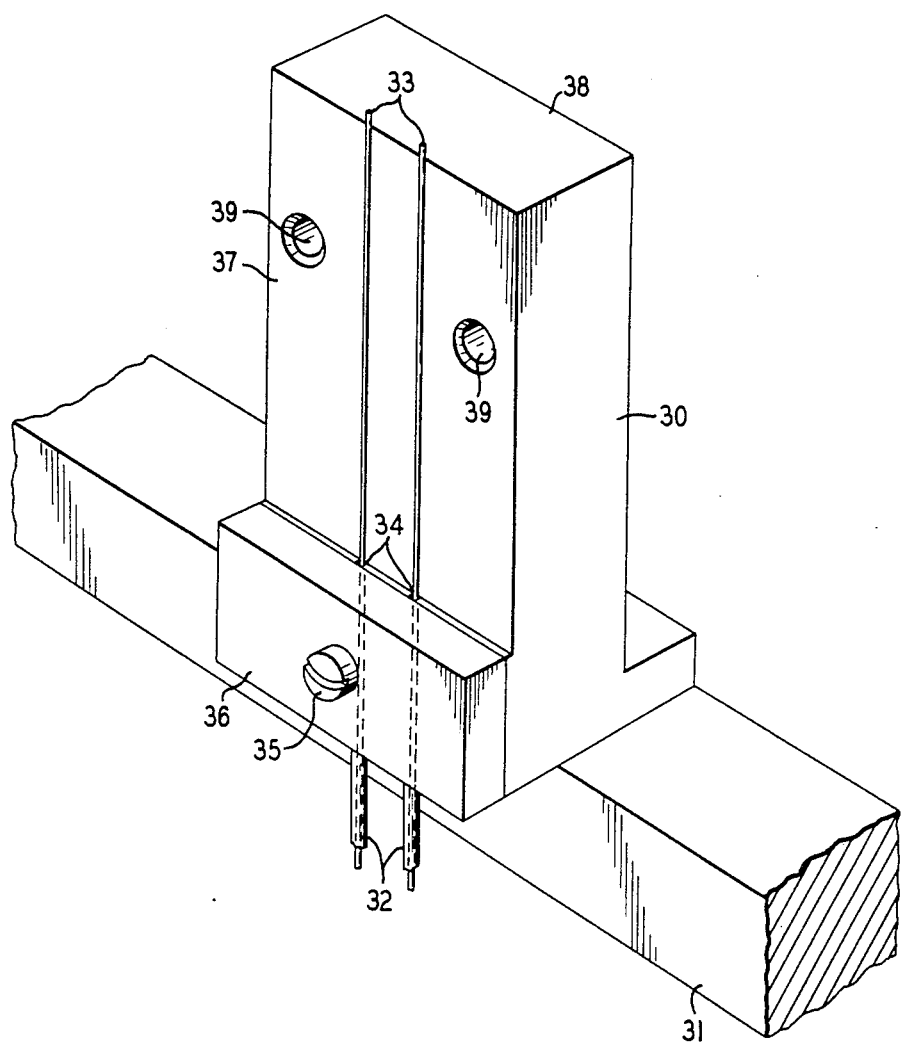
FIG. 2 is a pictorial illustration of a frame plug or fiber holder subassembly for use in an optical coupler with the article and module of FIG. 1.
Figure 3:
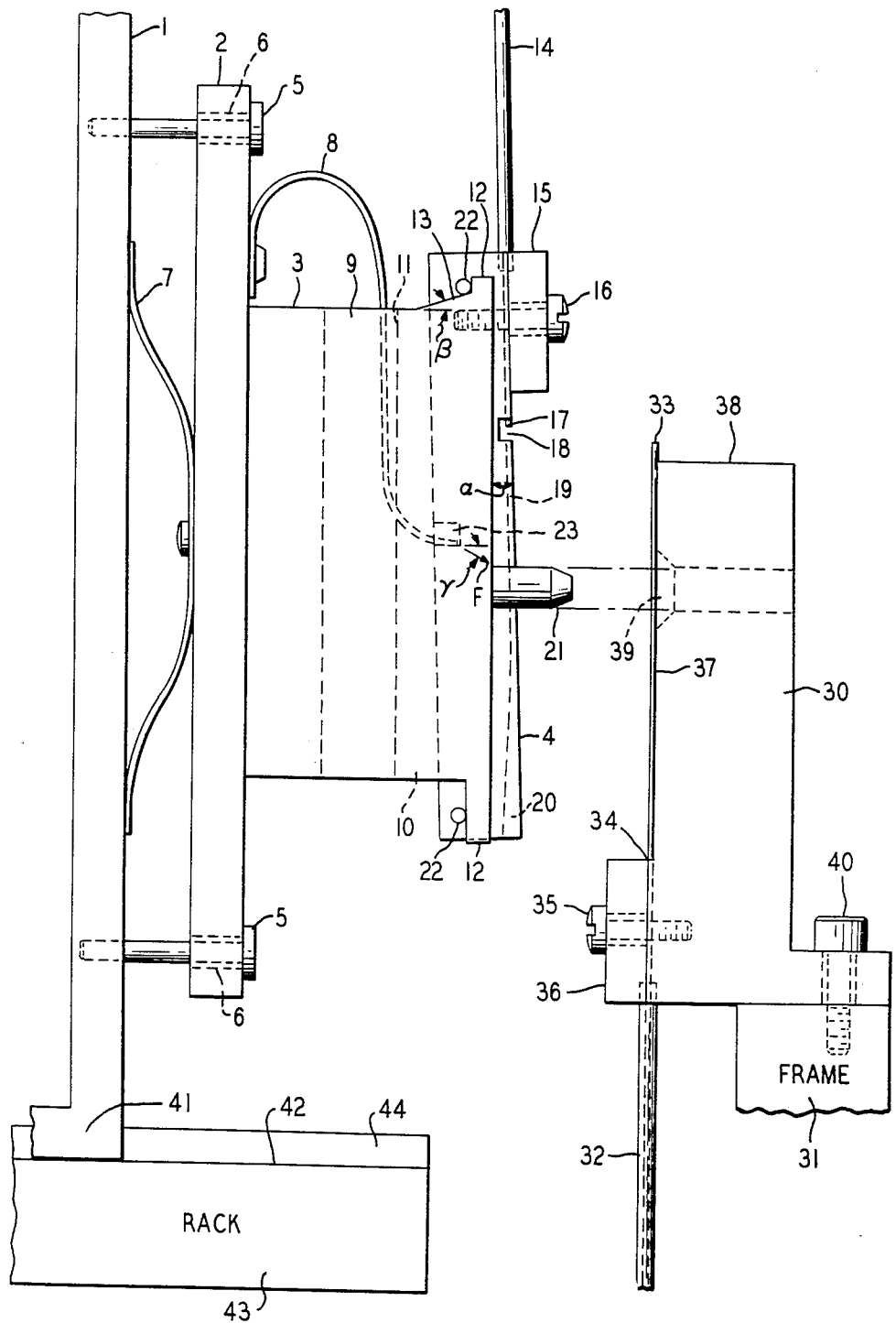
FIG. 3 is a side elevation view showing a communications bay having a rack holding the module including the article of FIG. 1 in a position just prior to completion of an optical fiber connection with the frame plug holder of FIG. 2 according to the invention.

FIGS. 1, 2, and 3 illustrate an advantageous embodiment of the invention in which two pairs of optical fibers 14 and 32 are positioned and coupled together in repeatably connectable and disconnectable optical fiber connections. Like numbers refer to like structures in each of FIGS. 1, 2, and 3.

Located on a repeater or other communications module 1, in FIG. 1 is a platform 2 floated on a spring or other flexible article 7 and approximately positioned by means of posts 5 affixed to module 1 and riding in oversize holes 6. Firmly affixed to platform 2 is a mounting block 3 for holding a fiber alignment receptacle 4 flexibly depressible against a spring 8 of resilient material. Mounting block 3 is provided with alignment pins 21, having beveled coarse alignment surfaces. Comparing FIGS. 1, 2, and 3 it will be noted that alignment pins 21 engage alignment channels 39 having mating coarse alignment surfaces as the module 1 is suitably manually inserted and slid with bottom 41 on surface 42 of channel 44 into a rack 43 against ends 33 of optical fibers 32, which are in turn held by frame block 30 supported by frame 31. Engagement of pins 21 in channels 39 appropriately orients platform 2, mounting block 3 and fiber receptacle 4 relative to fiber holder 30.

Fiber alignment receptacle 4 is held flexibly depressible in interior 10 of mounting block 3 by means of spring 8 resting in notch 23 of receptacle 4 as shown in FIG. 3. Sliding pins 22 of receptacle 4 and retaining lips 12 of mounting block 3 restrain and prevent expulsion of receptacle 4 from interior 10 and hold receptacle 4 flexibly depressible in interior 10 against spring 8 which is in turn compressed between receptacle 4 and mounting block platform 2. Surfaces 11 of mounting block 3 prevent unduly extreme depression of receptacle 4 therein. Spring 8 is suitably guided in channel 9 in the interior 10 of mounting block 3.

The specific construction of fiber alignment receptacle 4 is now described. Jacketed optical termination fibers 14 having ends 17, which provide optical termination for module 1 in the coupler subassembly of FIG. 1, are firmly clamped or affixed or held to receptacle 4 by means of clamp 15 and screw 16. Termination fiber ends 17 protrude over a transverse channel 18 cut or molded in receptacle 4, and the fibers ends 17 are suitably positioned collinear with the positioning grooves 19 and separated from them by channel 18 therebetween. Opposite the nearby fiber ends 17 and on a substantially plane surface of alignment receptacle 4 are located a pair of outwardly tapering V-grooves extending from precision positioning zones 19 at the narrower groove ends to remote capture zones 20 of the grooves where each groove end is wider and deeper than at the precision zones 19.

Referring to FIGS. 2 and 3, a pair of jacketed optical fibers 32 having ends 33 is positioned and clamped in a holder, called a frame block or plug, which includes a bracket 30 for providing backing and secure mounting, bracket 30 having a lateral support surface or back wall surface 37 for fiber ends 33. Fibers 32 are securely held in V-grooves 34 by clamp 36 and screw 35. In this way a portion of the length at the end of each of the fibers 32 is respectively laterally exposed or exposable to each of the previously mentioned grooves 19. Coarse alignment channels 39 are provided substantially perpendicular to the backing surface 37 of bracket 30. Fiber ends 33 are positioned so as to slightly clear the plane of the top surface 38 of bracket 30, the back wall surface 37 being disposed along substantially the whole of the ends of fibers 32 for ample support thereof. Referring to FIG. 3, bracket 30 is firmly mounted to equipment bay frame 31 by means of bolt 40.

The process of precision fiber positioning and coupling is now described. Module 1 provided with a coupling subassembly article including platform 2, mounting block 3 and fiber receptacle 4, is pushed or moved horizontally to the right in FIG. 3, whereupon alignment pins 21 engage beveled alignment holes 39 effectuating a preliminary or coarse alignment between fibers 14 and 32. As the motion proceeds, each of the fibers 32 is respectively brought together with each of the grooves of the alignment receptacle 4 and is captured or confined near points 34 on the holder 30 in capture zone 20 of the grooves of the alignment receptacle 4. It will be noted that the grooved surface plane of alignment receptacle 4 is tilted at a small acute angle $\alpha$, called the initial orientation angle, relative to holder surface 37. In FIG. 3 the angle $\alpha$ is drawn from the receptacle surface to the nearby face of mounting block 3 since the mounting block face is shown parallel to fibers 32; but in general the tolerances of the coarse alignment surfaces of pins 21 and holes 39 permit the mounting face to have an angle which in the worst case should not reduce the actual initial orientation angle $\alpha$ to zero. In this manner, capture of the optical fibers 32 is accomplished at points on the fibers remote from the very ends 33.

Next, as the surface planes of receptacle 4 and mounting block 3 approach bracket 30 surface 37, the alignment receptacle 4 and holder 30 are automatically adjusted in relative orientation, in this case by adjustment of receptacle 4 against spring 8, so as to form a decreasing angle $\alpha$ relative to the holder bracket surface 37. Fiber ends 33 are progressively laterally urged into and seated in the alignment grooves on receptacle 4 so that the ends 33 reach and are precisely positioned ultimately in precision positioning zone 19 over channel 18.

The subassembly including mounting platform 2, flexible spring 8, and mounting block 3 acts as a means of flexibly providing a positioning pressure for this purpose. Spring 8 presses on receptacle 4 near the center thereof, and mounting block 3 restrains and retains receptacle 4 at pins 22 by means of lips 12 from release from the spring 8 pressure. In this manner receptacle 4 is flexibly depressed in mounting block 3 and the relative orientation angle of receptacle 4 and holder 30 is rendered automatically decreasable. Thus, the ends 33 of fibers 32 are precisely positioned collinearly opposed and longitudinally proximate to termination fiber ends 17 to complete an optical coupling without significant end abrasion owing to the capture process and the deep indentation, depression, or transverse channeling denoted by 18 in which the precision zones terminate.

The initial orientation angle $\alpha$ was selected in the design of the spring-loaded subassembly including platform 2, mounting block 3, spring 8, and fiber receptacle 4 by appropriately locating pins 22 so as to be about one inch apart and offset relative to each other in distance to the grooved surface of receptacle 4 by about 26 mils. This yields an angle $\alpha$ of about 1.6° which has been successfully used in a demonstration model of the invention. However, it is to be expected that angle $\alpha$ defined relative to the pins of receptacle 4 can have any value between a minimum and maximum such that $$\alpha_{min} < \alpha < \alpha_{max} \tag{1}$$

where $\alpha_{min}$ equals a worst case angle required to overcome angular misalignment in the coarse alignment of pins 21 and holes 39 so that the fiber ends 33 and 17 have an initial angle greater than zero. $\alpha_{max}$ is defined by frictional and practical design considerations and is believed to be such that $$\alpha_{max} = 90° - \arctan \mu_{4,37} \qquad (2)$$

where $\mu_{4,37}$ is the coefficient of friction between the surface of receptacle 4 and surface 37 of holder 30.

An advantageous feature of the optical fiber coupler arrangement of FIG. 3 is that spring 8 not only flexibly provides a positioning pressure in notch 23 so as to enable alignment receptacle 4 to adjust in orientation, but also provides a longitudinal pressure (downward in FIG. 3). As receptacle 4 is depressed in interior 10 of mounting block 3, upper pins 22 are caused to slide down an oblique or inclined guiding surface 13, having an acute incline angle $\beta$, thereby achieving a controlled longitudinal displacement of receptacle 4. The resulting operation is that once fiber ends 33 are located in precision positioning zone 19, which is near ends 17 of termination fibers 14, receptacle 4 continues to be depressed into mounting block 3 and longitudinally adjusts itself and slides on the surface of pins 22 relative to holder 30 so that fiber ends 17 come into collinear abutment with fiber ends 33. Taking receptacle 4 as a reference, ends 33 of fibers 32 are slid against fiber ends 17 as a stopping surface. An important feature in the operation of this aspect of the invention is the relative sliding motion of held fiber end 33 in holder 30 with respect to receptacle 4 wherein a means of stopping the sliding is provided, in this case the clamped termination fibers 14 having ends 17 which act as a surface to stop the sliding. Any excess pressure on fiber ends 33 is relieved by an accumulation of fiber 32 length in capture zones 20. As a result, a disconnectable optical fiber coupling featuring precise transverse and longitudinal positioning is effected and completed in a single horizontal motion of module 1.

The incline angle $\beta$ of surface 13 was selected in the design of the spring-loaded subassembly including platform 2, mounting block 3, spring 8, and receptacle block 4 by providing the inclined surface 13 with a rise of about 25 mils and a length of about 75 mils. This yielded an incline angle $\beta$ of about 18° which has been quite satisfactory in a demonstration model of the invention. It is to be expected that angle $\beta$ can have any value between a minimum and a maximum such that $$\beta_{min} < \beta < \beta_{max}. \qquad (3)$$

$\beta_{min}$ is defined by the maximum length required for sliding optical fibers, which should not excced the width of channel 18, and by the maximum inward displacement of receptacle 4 available when the connection is made. Accordingly, $$\beta_{min} = \arctan\left(\frac{\text{fiber sliding length}}{\text{receptacle displacement}}\right). \qquad (4)$$

$\beta_{max}$ is defined by considerations of friction between pins 22 and incline 13 as well as by an angle $\gamma$ of spring force F. It will be recognized that $\gamma$ should be positive, as illustrated in FIG. 3, to effect the desired sliding action and that in order for the spring force to overcome friction the following inequality should be satisfied:

$$\gamma > \arctan \mu_{4,33} \qquad (5)$$

where $\mu_{4,33}$ is the coefficient of friction between the material of receptacle 4 and the material of fiber ends 33. Analysis of the friction of pin 22 against incline 13 shows that $$\beta_{max} = 90° - \arctan \mu_{13,22} - \gamma \qquad (6)$$

where $\mu_{13,22}$ is the friction coefficient of pins 22 and incline 13. It may readily be concluded that design freedom is greatest when low friction components, such as ones having smooth surfaces, are utilized in the construction of connectors according to the invention. It is to be understood in all cases, however, that the above calculations are meant by way of clarification and illustration of general principles relating to some embodiments and not as limitations of the invention in its broadest scope.

Figure 4:
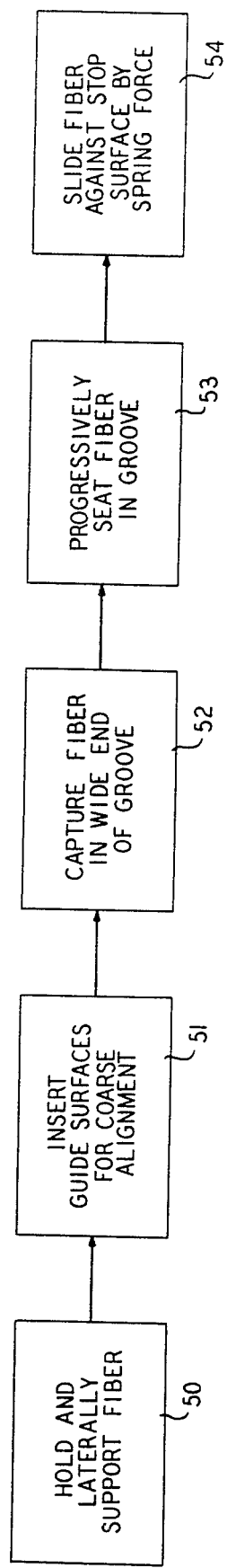
FIG. 4 is a block diagram of the sequence of steps employed in carrying out the coupling method of the present invention.

FIG. 4 illustrates the steps performed by the apparatus of the invention in the inventive process of accurate or precise fiber positioning and coupling to a termination. First a fiber is held and laterally supported in step 50. Next, coarse alignment of the fiber is accomplished in step 51, as by the insertion of guide surfaces in an apparatus. When the coarse alignment is complete, the fiber is captured in the groove remote from the termination in step 52. As the process continues, the fiber is progressively and increasingly precisely laterally seated in the groove near the termination as indicated in step 53. Once seated in a precisely defined position, the fiber is automatically urged in step 54, suitably by springably pressuring the fiber, so as to slide the fiber against the termination at a stop surface. Advantageously accurate coupling to the termination results since the fiber has negligible angular misalignment, lateral misalignment, and longitudinal separation relative to the termination.

Figure 5:
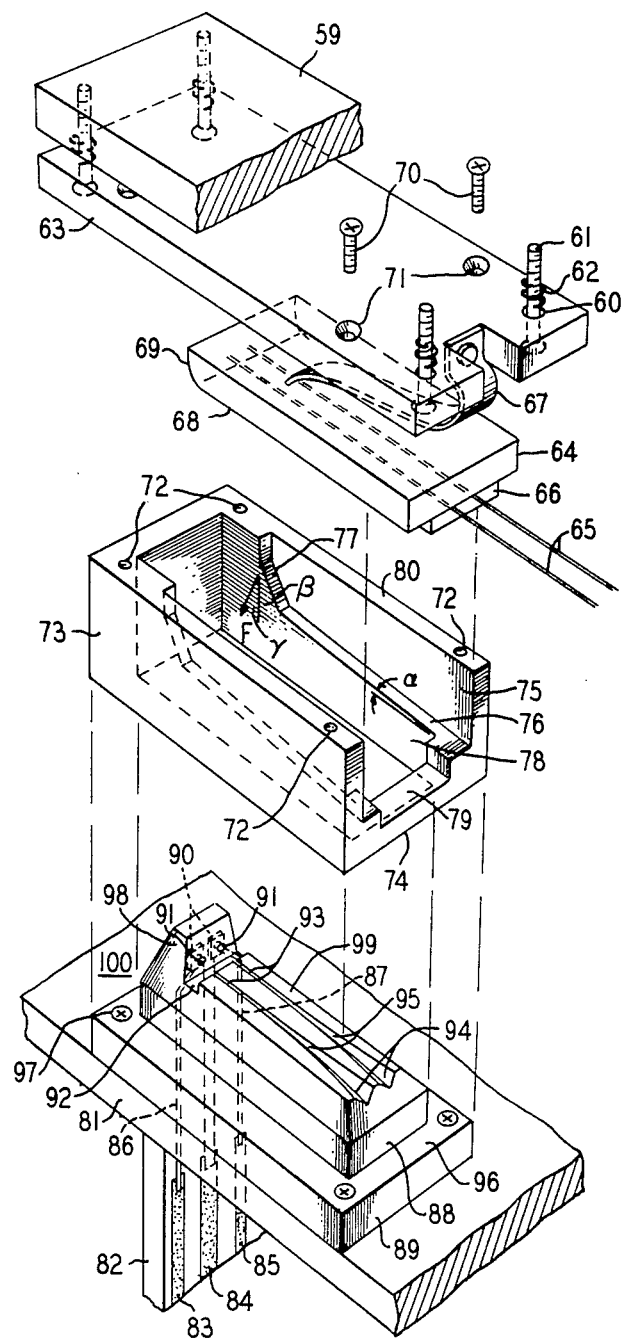
FIG. 5 is an exploded perspective view of an optical coupler of the invention for coupling optical fibers in a spring-loaded fiber holding subassembly of the invention to semiconductor devices molded into a plastic block subassembly fashioned according to the invention.

Another embodiment of the apparatus of the invention for practicing the method of FIG. 4 is shown in an exploded perspective view in FIG. 5. A frame 59 or other rigid fixed support member is provided for a fiber holding and mounting subassembly including a mounting platform 63, a spring 67, and a holder 64 for ends of optical fibers 65 clamped thereon by member 66 and retained laterally exposed in a mounting block 73 in contact with or against resilient compression spring 67. Mounting platform 63 is floatably mounted on support 59 suitably by means of posts 61 in oversize holes 60 and with compression springs 62. Mounting block 73 is affixed to mounting platform 63 by means of screws 70 passing through platform holes 71 and being secured in mounting block holes 72 so as to form a composite mounting block assembly. Spring 67 is compressed between platform 63 and fiber holder 64 and presses holder 64 against retaining or restraining ledges 76 of shaped mounting block 73. The width of fiber holder 64 just clears opposite surfaces 75 of the interior of mounting block 73. Clamping member 66 clears slot 79 of mounting block 73. The pressing force F of spring 67 is primarily downward and slightly toward oblique inclined guiding surfaces 77 of mounting block 73. Surfaces 77 are used for longitudinal alignment of fibers 65 as further described below. Retaining ledges 76 are slanted at a small but significant nonzero angle $\alpha$ relative to platform 63.

A repeater module 81 suitably slideable as previously described in connection with FIG. 3, has a connector article 100 affixed thereto by means of screws 97. Article 100 is suitably a molded plastic fiber alignment receptacle having two outwardly tapering grooves 95 including capture zones at wide ends 94 and precision zones at narrower ends 93 of the grooves 95 in planar surface 99. A transverse groove or depression 92, which is deeper than the grooves in the zones 93 terminates the zones 93 and separates them from a nearby stop block portion 98 having photodiodes or other electrooptical device terminations 90 and transparent protective members 91, made of a material such as plastic, glass or sapphire, embedded therein. The photodiodes 90 are shown connected by pins 86, 87 and a common central pin to an external printed circuit 82 having conductors 83, 84, and 85 respectively. The pins protrude from the molded plastic of article 100 through holes in the repeater module 81.

The process in which optical connection is made by the fibers 65 with photodiodes 90 according to the present invention is now described. Repeater module 81, suitably is inserted and slides in a rack channel, as hereinbefore suggested at 41, 42, 43, and 44 in FIG. 3, toward mounting block 73 which holds holder 64 and fibers 65 flexibly depressible therein. Since holder 64 with fibers 65 initially rests against retaining ledges 76, the fibers 65 are oriented at an initial orientation angle $\alpha$ relative to planar surface 99 and grooves 95 of article 100. (Retaining ledge slant angle $\alpha$ is analogous to the angle $\alpha$ set by pin 22 placement in FIG. 3.) Accordingly, a portion of the length of fibers 65 near clamp 66 is captured in the wide ends 94 of grooves 95. At the same time, flat surface 99 pushes fiber holder 64 away from retaining ledge 76. In the meantime, the beveled or chamfered exterior 98 of the alignment receptacle block 100 has completed a preliminary coarse alignment with opposed coarse alignment surfaces 78 of mounting block 73 so that mating coarse alignment surfaces 88 of the receptacle pass snugly into the rectangular aperture of the interior of block 73 bounded by surfaces 78. Eventually, alignment block surface 96 comes into contact with surface 74 of mounting block 73. During this motion, fibers 65 are progressively brought against and laterally urged into grooves 95 of article 100 beginning with capture zones 94 and reaching precision positioning zones 93 until their very ends rest in zones 93 and extend over transverse channel 92. Fiber holder 64 has its lower surface 68 parallel with surface 99 of the alignment receptacle. In this way the relative orientation angle of the alignment receptacle and the fiber holder 64 is automatically decreased to essentially zero degrees, this time by an adjustment of fiber holder 64 against spring 67 as distinct from the arrangement of FIG. 3. Flexible spring 67 in FIG. 5 presses against holder 64 while hollow mounting block 73 and platform 63 cooperate in this holder subassembly to restrain holder 64 from release from the spring 67 pressure. This makes the holder 64 flexibly depressible, thereby to permit the relative orientation angle of the receptacle 100 and holder 64 to be automatically decreasable.

As fiber holder 64 is pushed away from retaining surface 76, rounded surface 69 of holder 64 is pressed longitudinally so as to remain in sliding contact along oblique inclined guide surfaces 77 at all times due to force F at an angle $\gamma$ exerted by spring 67. (The incline angle $\beta$ of surface 77 and force angle $\gamma$ are analogous to angles $\beta$ and $\gamma$ in FIG. 3.) The longitudinal motion of fiber holder 64 flexibly urges and slides fibers 65 automatically against protective glass members 91 of the alignment receptacle 100, completing the optical connection with the electrooptic devices. The glass members 91, which can be bits of a high numerical aperture optical fiber, are optically transmissive and act as stopping surfaces for fibers 65. Glass members 91 and the plastic stop portion 98 nearby encapsulate and protect the electrooptical devices 90.

The optical coupler is disconnected when desired by pulling repeater module 81 bearing alignment receptacle 100 from mounting block 73. The pressure of spring 67 temporarily holds surface 68 of fiber holder 64 parallel to surface 99 of article 100 while the sliding motion of surface 69 along incline 77 longitudinally retracts the fibers. Then when surface 68 of fiber holder 64 becomes restrained by ledge 76, fibers 65 are removed from grooves 95 and the disconnection is completed.

In all cases, it is to be understood that the foregoing description of specific embodiments of the present invention is merely illustrative of the broader scope thereof. Numerous other embodiments of the invention may be constructed by those skilled in the art for specific applications so as to fully realize the utility of the present invention.

What is claimed is:

1. A fiber positioner comprising:
 fiber receptacle means having at least one groove extending from a precision positioning zone of each said groove to a capture zone of each said groove where each said groove is wider than at each said precision zone;
 means for holding at least one fiber so that at least a portion of the length of each said fiber is respectively laterally exposable to each said groove; each said fiber portion being able to be respectively brought together with each said groove at each said capture zone, said receptacle means and said holding means having an initial orientation angle relative to one another; and
 means for flexibly providing a positioning pressure so that as each said fiber portion is respectively brought together with each said groove at each said capture zone without bending of said fiber portion said relative orientation angle of said receptacle means and said holding means is automatically decreasable to essentially zero degrees, said pressure also serving to advance each said fiber portion in each said groove beginning with said capture zone and reaching said precision positioning zone without the end face of each said fiber contacting any surface of said groove.

2. A fiber optic coupler comprising a fiber positioner as claimed in claim 1 and one or more electrooptical devices respectively located near each said precision positioning zone of said fiber receptacle means.

3. A fiber optic coupler as claimed in claim 2 wherein at least one of said electrooptical devices is a photodiode.

4. A fiber positioner as claimed in claim 1 wherein said pressure means comprises a flexible material pressing said receptacle means and further comprises mounting block means for restraining said receptacle means from release from said pressing so as to make said receptacle means flexibly depressible and thereby permit said relative orientation angle of said receptacle means and said holding means to be automatically decreasable.

5. A fiber positioner as claimed in claim 4 wherein said fiber positioner mounting block means is floatably mounted and includes coarse alignment surfaces and said fiber positioner holding means includes mating coarse alignment surfaces.

6. A fiber positioner as claimed in claim 1 wherein said pressure means comprises a flexible material pressing said holding means and further comprises mounting block means for restraining said holding means from release from said pressing so as to make said holding means flexibly depressible and thereby permit said relative orientation angle of said receptacle means and said holding means to be automatically decreasable.

7. A fiber positioner as claimed in claim 6 wherein said fiber positioner mounting block means is floatably mounted and includes coarse alignment surfaces and said fiber positioner receptacle means includes mating coarse alignment surfaces.

8. An optical fiber coupler comprising a fiber positioner as claimed in claim 1 wherein each said fiber portion is an optical fiber end portion, said coupler further comprising one or more optical termination fibers having an end or ends respectively affixed near each said precision positioning zone of said fiber receptacle means so that when each said end portion of each said fiber held by said holding means reaches said precision positioning zone, an optical coupling is completed between said optical fiber end portions and said termination fibers.

9. An optical fiber coupler as claimed in claim 8 wherein at least one of said precision positioning zones terminates in a depression whereby said optical fiber ends are protected from abrasion and contamination.

10. An optical fiber positioner as claimed in claim 1 wherein each said fiber portion is an optical fiber end portion and at least one of said precision positioning zones terminates in a depression whereby at least one said optical fiber end is protected from abrasion and contamination.

11. An optical fiber positioner as claimed in claim 10 in which said depression is a channel transverse to each said groove.

12. A fiber positioner as claimed in claim 1 wherein each said fiber portion is a fiber end portion, said fiber positioner further comprises fiber stopping means having a stopping surface, and said pressure means operates so that when each said fiber end portion is brought against each said groove said receptacle means and said holding means are enabled to slide relative to each other so that at least one fiber end in a said precision positioning zone is slid against said stopping surface.

13. A fiber optic coupler utilizing the fiber positioner claimed in claim 12 wherein said stopping means is protective of one or more electrooptical devices respectively located near each said precision positioning zone of said fiber receptacle means.

14. An optical fiber coupler utilizing the fiber positioner claimed in claim 12 wherein said stopping means comprises one or more termination optical fibers respectively affixed near each said precision positioning zone of said fiber receptacle means and said stopping surface is a surface of an end of at least one of said termination fibers.

15. A fiber positioner as claimed in claim 12 wherein said pressure means comprises a flexible material contacting said receptacle means, and said pressure means further comprises mounting block means having an inclined surface and an interior, said receptacle means being held flexibly depressible in said interior of said mounting block means against said flexible material, a surface of said receptacle means being slidable along said inclined surface of said mounting block means so as to enable said receptacle means to slide relative to said holding means.

16. A fiber positioner as claimed in claim 12 wherein said pressure means comprises a flexible material contacting said holding means, and said pressure means further comprises mounting block means having an inclined surface and an interior, said holding means being held flexibly depressible in said interior of said mounting block means against said flexible material, a surface of said holding means being slidable along said inclined surface of said mounting block means so as to enable said holding means to slide relative to said receptacle means.

17. A fiber positioner comprising:
fiber receptacle means having a stopping surface and having at least one groove having a precision positioning zone located near said stopping surface;
means for holding an end of at least one fiber so that each said fiber is respectively exposable to each said groove, each said fiber end being able to be brought against each said groove respectively; and
means for resiliently providing a positioning pressure so that when each said fiber end is brought against each said groove respectively said receptacle means and said holding means are enabled to slide relative to each other so that at least one said fiber end in a said precision positioning zone is slid against said stopping surface, at least one depression being located between said precision positioning zone and said stopping surface of said fiber receptacle means whereby fiber end abrasion and contamination are reduced.

18. In a method for accurately coupling an optical fiber end to a termination the steps comprising:
holding and laterally supporting said fiber;
capturing said fiber in a groove remote from said termination without the bending of said fiber;
progressively and increasingly precisely laterally seating said fiber in said groove near said termination without the fiber end contacting any portion of said groove; and
springably automatically pressuring said fiber so as to slide said fiber against said termination, whereby said coupling is achieved.

* * * * *